(12) United States Patent
Statz

(10) Patent No.: US 6,279,879 B1
(45) Date of Patent: Aug. 28, 2001

(54) CORNER FENCE POST BRACING SYSTEM

(75) Inventor: Raymond A. Statz, Waunakee, WI (US)

(73) Assignee: Qual Line Fence Corporation, Waunakee, WI (US)

( * ) Notice: Subject to any disclaimer, the term of this patent is extended or adjusted under 35 U.S.C. 154(b) by 0 days.

(21) Appl. No.: 09/263,372

(22) Filed: Mar. 5, 1999

(51) Int. Cl.⁷ ............................................... E04H 17/14
(52) U.S. Cl. .............................. 256/65; 256/35; 403/403; 248/219.2
(58) Field of Search ................... 248/219.2, 201, 248/200.1; 403/403, 231; 256/35, 36, 47, 64, 65; D08/380, 381

(56) References Cited

U.S. PATENT DOCUMENTS

| | | | |
|---|---|---|---|
| D. 19,587 | * 1/1890 | Steltz | D8/380 X |
| D. 34,083 | * 2/1901 | Shrader | D8/381 X |
| D. 216,158 | * 11/1969 | Williams | D8/381 X |
| D. 256,747 | * 9/1980 | Stephen | D8/380 X |
| D. 285,410 | * 9/1986 | Webber | D8/380 X |
| 292,023 | * 1/1884 | Manlove | 256/65 |
| D. 310,165 | * 8/1990 | Cobb | D8/381 |
| D. 349,844 | * 8/1994 | Jaremkof | D8/380 |
| D. 352,654 | * 11/1994 | Hansen | D8/380 |
| D. 358,983 | * 6/1995 | Friend et al. | D8/381 |
| D. 369,293 | * 4/1996 | Gusdorf et al. | D8/381 |
| D. 384,879 | * 10/1997 | Carlson | D8/381 |
| 529,331 | * 11/1894 | Lane | 403/189 |
| 804,969 | * 11/1905 | Olson | 256/35 |
| 1,056,576 | * 3/1913 | Olson | 256/35 |
| 1,208,361 | * 12/1916 | Olson | 256/35 |
| 1,633,000 | * 6/1927 | Culver | 256/64 |
| 2,833,503 | * 5/1958 | Harshbarger et al. | D8/381 |
| 2,859,879 | * 11/1958 | Rogers et al. | D8/381 |
| 2,906,551 | * 9/1959 | May | 256/65 X |
| 4,182,362 | * 1/1980 | Hewson et al. | 248/219.2 |
| 4,183,317 | * 1/1980 | Follick | 256/64 X |
| 4,304,395 | 12/1981 | Witt | 256/64 |
| 4,349,181 | 9/1982 | Asher et al. | 256/35 |
| 4,616,950 | * 10/1986 | Morris | 403/231 |
| 4,679,772 | 7/1987 | Peterson | 256/36 |
| 4,682,761 | 7/1987 | Hanneken | 256/36 |
| 4,856,423 | * 8/1989 | Burns | 99/421 H |
| 4,889,322 | 12/1989 | Wagner | 256/36 |
| 4,893,787 | 1/1990 | Watson | 256/35 |
| 5,042,780 | 8/1991 | Yearwood | 256/36 |
| 5,061,109 | 10/1991 | Miller | 403/36 |
| 5,192,055 | 3/1993 | Griggs et al. | 256/35 |
| 5,738,342 | 4/1998 | Van Winkle | 256/65 |
| 6,053,465 | * 4/2000 | Kluge | 248/201 |

FOREIGN PATENT DOCUMENTS

78092 * 2/1951 (NO) .

* cited by examiner

Primary Examiner—Lynne H. Browne
Assistant Examiner—David E. Bochna
(74) Attorney, Agent, or Firm—Michael Best & Friedrich LLP

(57) ABSTRACT

A system for bracing corner posts utilized in stretched tension fences includes two triangular gussetted braces, each fixable to a corner post and a brace post. The braces each include engagement portions which engage ends of a rigid cross member which extends between the two posts thereby preventing racking of the posts. This bracing system does not utilize truss wires or diagonal brace members in areas where an animal is likely to entangle its legs.

13 Claims, 3 Drawing Sheets

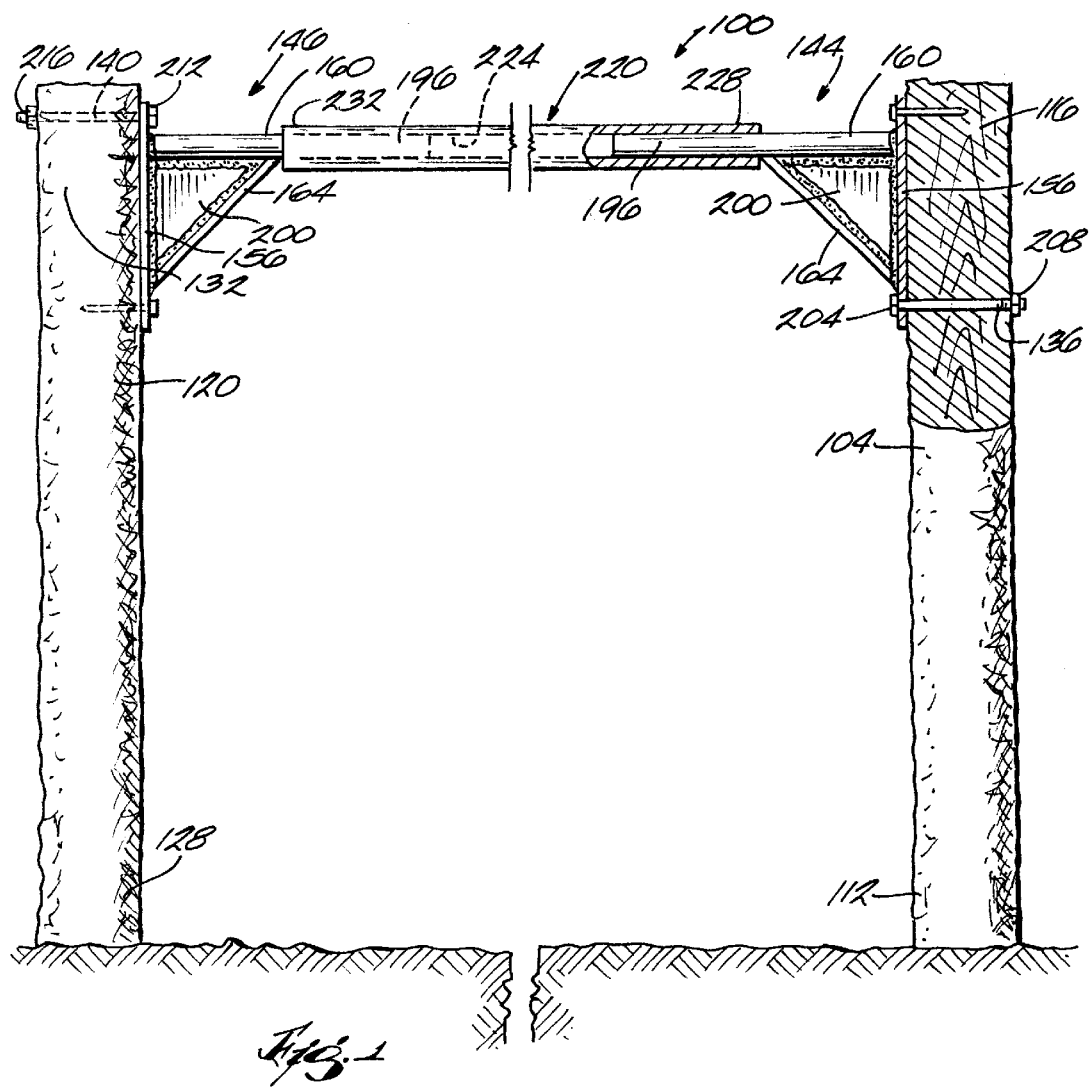
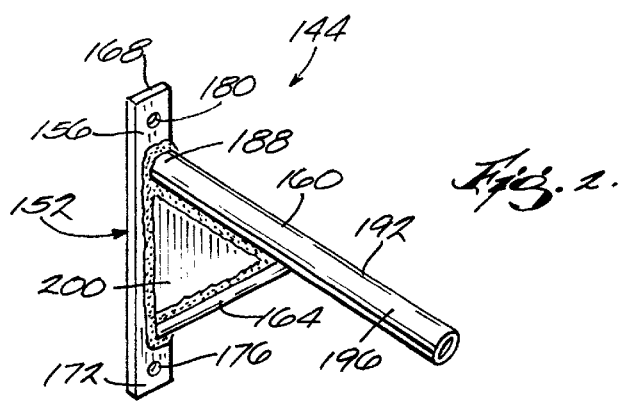

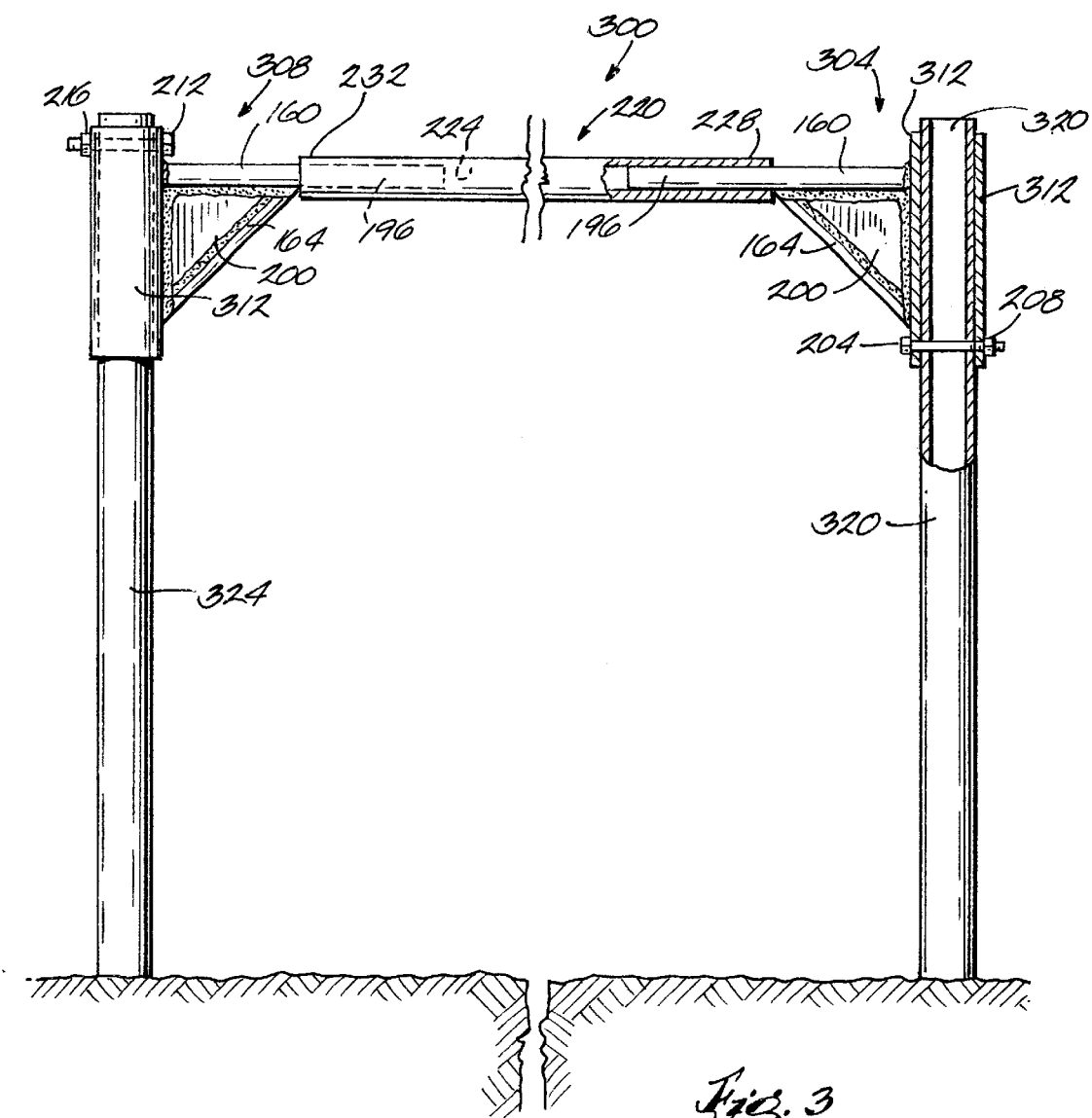
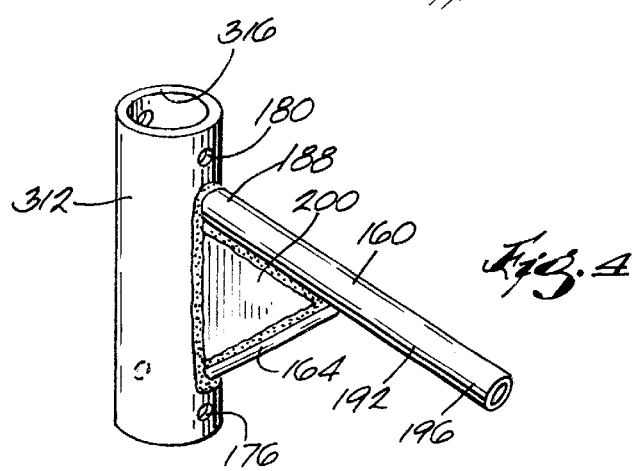

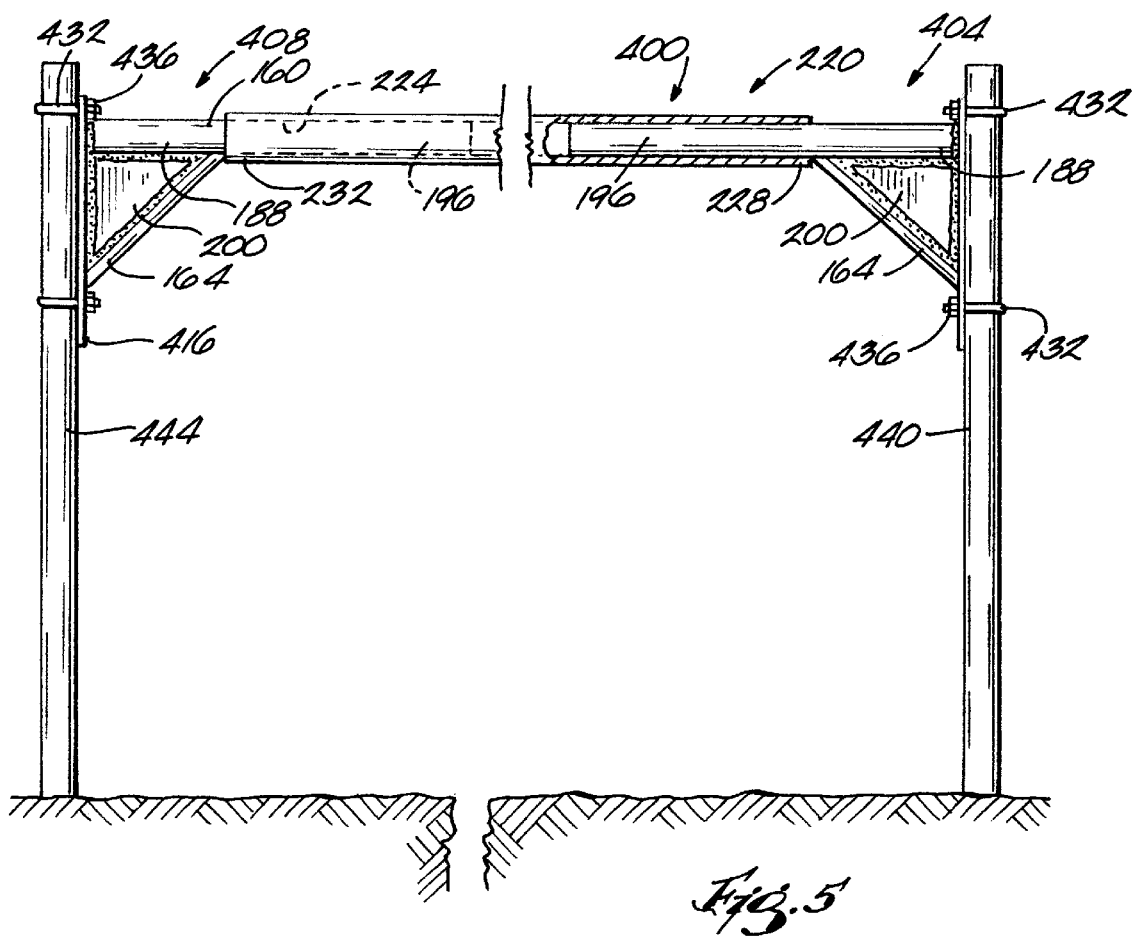
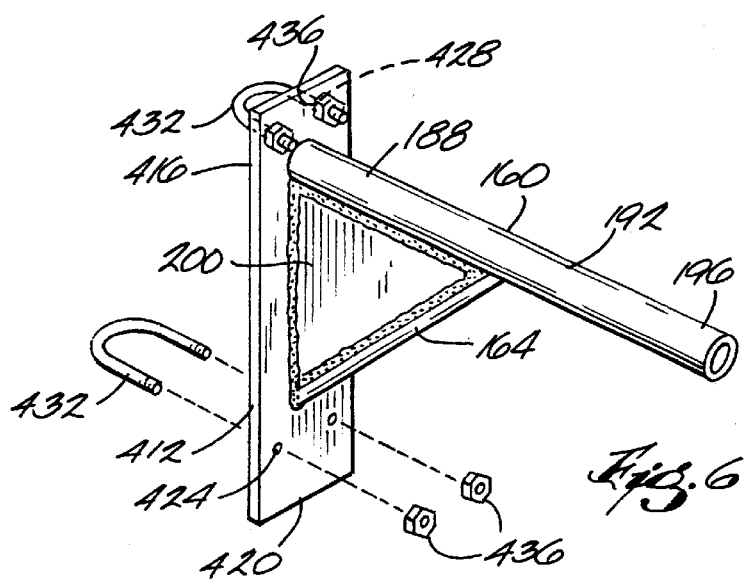

CORNER FENCE POST BRACING SYSTEM

FIELD OF THE INVENTION

The invention relates generally to a fence. More particularly, the invention relates to a bracing system for corner fence posts and end posts for fences under tension.

BACKGROUND OF THE INVENTION

Many examples of fence corner post bracing systems are known in the art. Examples of these bracing systems are disclosed in U.S. Pat. Nos. 170,024; 282,039; 436,279; 444,753; 451,461; 540,161; 615,855; 725,770; 865,858; 966,969; 2,445,545; 3,014,701; 4,349,181; 4,679,772; 4,682,761; 4,893,787; 5,192,055; and 5,738,342, incorporated herein by reference.

Corner fence posts on stretched fences are often subjected to substantial constant pull or tension. Corner fence posts utilized in high tensile fences will often be subjected to tension forces of greater than 3,500 pounds or more. If the post is not properly braced, such forces will pull the fence post out of the ground or towards the direction of the tension, causing the tension to be lost and the fence to sag or be racked.

A common arrangement for bracing corner fence posts involves utilizing a corner post and a second brace post which are spaced apart. The spaced apart fence post may be braced in a number of ways. In one arrangement, a rigid brace member extends between the two posts, perpendicular to the posts and parallel to the ground, and then a diagonal truss wire is installed to keep the assembly from racking. In another arrangement, a diagonal brace member is incorporated. The diagonal brace member extends diagonally between the top of one of the posts and the bottom of the other post. The diagonal brace member must be a rigid member such as a piece of wood or steel Different combinations of the basic systems are possible. For instance, a corner post arrangement may include three posts, or two posts having two diagonal braces.

A problem with many currently used bracing systems, especially diagonal brace systems and diagonal truss wires, is that animals such as horses may entangle their legs between the brace and the fence, causing injury to the animal. Furthermore, bracing systems employing only horizontal cross-members are often not sufficient to resist high pull forces or tensions. What is needed in the art is a bracing system that employs a horizontal brace member located at a sufficient distance above the ground so that the animals' legs will not become entangled with the brace, and yet is also capable of withstanding high pull forces.

SUMMARY OF THE INVENTION

It is a feature of the present invention to provide a bracing system for corner fence posts. It is another feature of the present invention to provide a bracing system for corner posts utilized in high tensile fences which can withstand high pull forces so that the corner posts remain plumb. It is another feature of the present invention to provide a bracing system which can be utilized with posts driven into the ground, avoiding the need for extensive underground bracing of the fence posts. It is another feature of the present invention to provide a corner fence post bracing system lacking pinch points, truss wires and truss rods so that animals' legs will not become entangled.

According to one embodiment of the present invention, a corner post bracing system includes a corner post having a vertical axis, a brace end, and a corner post bolt hole. The bracing system further includes a brace post having a vertical axis, a brace end, and a brace post bolt hole. The brace post is spaced apart from and substantially parallel to the corner post.

The bracing system further includes a pair of substantially identical gussetted braces, namely, the corner post brace and the brace post brace. Each brace includes a triangular frame. The triangular frame includes a vertical frame member with an upper end and a lower end. The vertical frame member may be either flat and rectangular or cylindrical. The lower end of the vertical frame member has therethrough a lower mounting bolt hole for fixing the brace to the corner post. The upper end of the vertical frame member has therethrough an upper mounting bolt hole for fixing the brace to the brace post. The triangular frame also preferably includes a cylindrical upper frame member extending outwardly and horizontally from the vertical frame member upper end. The upper frame member having an inner end and an outer end. The triangular frame also includes a diagonal frame member extending from the upper frame member outer end to the vertical frame member lower end. Preferably, a triangular gusset plate is fixed within the triangular frame and extends between the vertical frame member, upper frame member, and diagonal frame member, thereby supporting the brace. The braces are preferably fixable to the respective posts by means of separate bolt and nut combinations, the bolts respectively extending through the mounting bolt holes and the post bolt holes and securable by the nuts. Preferably, a brace collar surrounds the upper frame member outer end and a brace extension extending from the upper frame member.

The bracing system further preferably includes an elongated cylindrical cross-member extending between the corner post and the brace post. The cross-member has a corner end and a brace end, the corner post brace extension being insertable into the corner end and the brace post brace extension being insertable into the brace end so that the corner end engages the corner post collar and the brace end engages the brace post brace collar, thereby bracing the corner post against the brace post when a force is exerted in the direction of the brace post or away from the corner post.

In another embodiment of the present invention, the vertical frame member includes at least a pair of mounting holes located therethrough such that a U-bolt or similar assembly extends through the mounting holes in order to secure the gussetted brace to the corner post or brace post.

Other features and advantages of the invention will become apparent to those skilled in the art upon review of the following detailed description, claims and drawings.

BRIEF DESCRIPTION OF THE DRAWINGS

FIG. 1 is a perspective view of a fence post bracing system embodying the present invention.

FIG. 2 is a perspective view of a gussetted brace embodying the present invention.

FIG. 3 is a perspective view of an alternative fence post bracing system embodying the present invention.

FIG. 4 is a perspective view of an alternative gussetted brace embodying the present invention.

FIG. 5 is a perspective view of yet another alternative fence post bracing system embodying the present invention.

FIG. 6 is still another perspective view of an alternative gussetted brace embodying the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DESCRIPTION OF THE PREFERRED EMBODIMENTS

FIGS. 1 and 2 illustrate a fence post bracing system 100. The fence post bracing system 100 comprises a corner post 104 having a vertical axis, a ground end 112 and a brace end 116. The system 100 further comprises a brace post 120 spaced apart from and substantially parallel to the corner post 104. The brace post 120 also has a vertical axis, a ground end 128 and a brace end 132. The corner posts and brace posts described herein may be made of wood, metal or any other suitable material. The corner posts and brace posts described herein may be cylindrical or circular posts, square or rectangular or flat posts, or of any other configuration according to the present invention. The corner post 104 and brace post 120 are fixed in the ground. Preferably, the posts 104 and 120 are driven into the ground by means known in the art. However, the posts 104 and 120 may also be inserted into holes dug in the ground and filled with compacted dirt or concrete. Preferably, the posts 104 and 120 extend from about 36" to 54" into the ground and are from about 8' to 12' apart. Each post 104 and 120 also has therethrough a respective mounting hole or bolt hole 136 and 140, the purpose of which will be described below.

As shown in FIGS. 1 and 2, the bracing system 100 also includes a pair of gussetted braces, namely, a corner post brace 144 and a brace post brace 146. The gussetted braces 144 an 146 are substantially similar in detail, so only one will be described. Preferably, the braces are made of a metal, most preferably a steel alloy, but other materials such as an aluminum alloy or other materials known to those skilled in the art may be suitable for use according to the present invention. The brace 144 includes a triangular frame 152 preferably including a rectangular vertical frame member 156, a cylindrical upper frame member 160, and a diagonal, preferably circular, frame member 164. The rectangular vertical frame member 156 includes an upper end 168 and a lower end 172. The upper end 168 and lower end 172 have therethrough respective mounting bolt holes 180 and 176 SO that the braces 144 and 146 may be fixed to the posts 104 and 120, respectively. Although not shown, when the fence post bracing system is to be used on uneven ground, shims may be placed between the braces 144 and 146 and posts 104 and 120 as needed so as to enable the braces 144 and 146 to be parallel with the ground while the posts 104 and 120 remain plumb. The cylindrical upper frame member 160 has a substantially horizontal axis and extends outwardly and horizontally from the vertical frame member upper end 168. The upper frame member 160 has an inner end 188 and an outer end 192. A cylindrical brace collar (not shown) concentric with the upper frame member axis may surround the outer end 192 and a cylindrical brace extension 196 which extends from the outer end 192. The purposes of the brace collar and brace extension 196 will be explained below. The diagonal frame member 164 extends from the upper frame member outer end 192 to the vertical frame member lower end 172. Preferably, the vertical frame member 156, upper frame member 160 and diagonal frame member 164 are joined by welding.

The brace 144 further includes a triangular gusset plate 200. The gusset plate 200 is fixed within the triangular frame 152 and extends between the vertical frame member 156, upper frame member 160 and diagonal frame member 164. The gusset plate 200 provides support to the frame members 156, 160 and 164 to prevent the frame from collapsing when put under strain. Preferably, the gusset plate 200 is joined to the frame members 156, 160 and 164 by welding.

The corner post brace 144 is fixed to the corner post 104 by a fastening device combination or a bolt 204 and a nut 208. The bolt 204 extends through the lower mounting bolt hole 176 of the brace 144 and through the corner post bolt hole 136 and is secured by the nut 208. The brace post brace 146 is fixed to the brace post 120 by a fastening device combination or a bolt 212 and a nut 216. The bolt 212 extends through the upper mounting bolt hole 180 of the brace 146 and through the brace post bolt hole 140 and is secured by the nut 216.

The bracing system 100 also includes a rigid cross member 220. Preferably, the cross member 220 is a cylindrical member, such as a length of pipe, having therethrough a hole 224. The cross member 220 has a corner end 228 and a brace end 232. The corner post brace extension 196 is insertable into the hole 224 at the corner end 228 and the brace post brace extension 196 is insertable into the hole 224 at the brace post end 232 so that the cross member 220 extends between and is substantially normal to the corner post 104 and brace post 120. When a pull force or tension is applied to the corner post 104 in the direction of the brace post 120, since the corner post end 228 of the cross member 220 contacts the corner post brace 144 and the brace post end 232 of the cross member 220 contacts the brace post brace 146, the cross member 220 is firmly held in place. In this manner, the corner post 104 is braced against the brace post 120 or against the applied force or tension. In other words, the gussetted braces 144 and 146 prevent racking of the posts.

FIGS. 3 and 4 illustrate a fence post bracing system 300 which is an alternative embodiment of the invention. Except as described below, the fence post bracing system 300 is substantially identical to the fence post bracing system 100, and common elements have been labelled with the same reference numbers. The fence post bracing system 300 includes a pair of substantially identical gussetted braces 304 and 308. The corner post gussetted braces 304 and 308 include respective cylindrical vertical frame members 312 having therethrough bores 316 for receiving a corner post 320 or brace post 324, respectively. The gussetted braces 304 and 308 may be fixed to the posts 320 and 324, respectively, either by a nut and a bolt combination as shown and as described above, or they may be supported on the posts 320 and 324 by a brace band (not shown) encircling the posts 320 and 324 approximately 3 to 4 feet above the ground, or any equivalent fastening system. Although posts 320 and 324 are shown as cylindrical or circular posts and the frame members 312 are shown as cylindrical frame members so as to be properly received by posts 320 and 324, the posts 320 and 324 may be configured differently such as, for example, square posts, and the vertical frame members 312 may be configured in an appropriate manner so as to be properly positionable around posts 320 and 324.

FIGS. 5 and 6 illustrate a fence post bracing system 400 which is yet another alternative embodiment of the present invention. Except as described below, the fence post bracing system 400 is substantially identical to the fence post bracing system 100, and common elements have been labelled with the same reference numbers. The fence post bracing system 400 includes a pair of substantially identical gussetted braces 404 and 408. The gussetted braces 404 and 408 include respective rectangular vertical frame members 412 which include upper ends 416 and lower ends 420. The upper ends 416 and lower ends 420 have therethrough pairs of respective apertures 428 and 424. Preferably, U-bolts 432 are inserted through apertures 428 and 424 in each frame member 412 and held in place by nuts 436 as shown in order to attach the frame members 412 and, thereby, gussetted braces 404 and 408, to posts 440 and 444. The U-bolts may be replaced with other customized bolts in accordance with the shape of the mating posts or with other equivalent fastening devices. A pull force or tension can be applied in either direction with respect to posts 440 and 444. Although not shown, similar to the embodiment shown and described with reference to FIGS. 1 and 2, shims may be used to make the braces parallel with the ground and the posts plumb when the fence bracing system is used on uneven ground.

Various features of the invention are set forth in the following example and claims.

EXAMPLE 1

The ability of the corner fence post brace system described herein to withstand high pull forces was tested. Fence posts were driven 54" into the ground and spaced 10' apart. A chain hooked to a block and tackle was placed approximately 2' off the ground around the corner post, pressure was applied in the direction of the brace post. The pressure was slowly increased using a 15,000 pound winch. The corner fence post brace system was able to withstand pull forces of approximately 8,000 pounds as measured on a standard strain gauge before the cross member buckled into an "S" shape (becoming shorter) and the posts tilted.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. A fence post bracing system comprising:

a corner post having a vertical axis;

a brace post having a vertical axis and spaced apart from and substantially parallel to said corner post;

a corner post brace having a triangular frame which includes a vertical frame member having an upper end and a lower end, an upper fame member extending outwardly and horizontally from said vertical frame member upper end, said upper frame member having an inner end and an outer end, and a diagonal frame member extending from said upper frame member outer end to said vertical frame member lower end, said triangular frame further including a triangular gusset fixed within said triangular frame to support said frame, and a cross-member engagement portion extending from said upper frame member outer end, said corner post brace being attached to sad corner post;

a brace post brace having a triangular frame which includes a vertical frame member having an upper end and a lower end, an upper frame member extending outwardly and horizontally from said vertical fame member upper end, said upper frame member having an inner end and an outer end, and a diagonal frame member extending from said upper frame member outer and to said vertical frame member lower end, said triangular frame further including a triangular gusset fixed within said triangular frame to support said frame, and a cross-member engagement portion extending from said upper frame member outer end, said brace post brace being attached to said brace post;

an elongated cross-member, said cross-member extending between said corner post and said brace post such that said cross-member engages said cross-member engagement portion of said corner post brace and said cross-member engagement portion of said brace post brace so that said posts are braced against each other when a force is applied to one or both of said posts; and wherein at least one of said vertical frame members is cylindrical and includes therethrough a bore for receiving one of said posts.

2. A fence post bracing system comprising:

a corner post having a vertical axis;

a brace post having a vertical axis and spaced apart from and substantially parallel to said corner post;

a corner post brace having a triangular frame which includes a vertical frame member having an upper end and a lower end, an upper frame member extending outwardly and horizontally from said vertical frame member upper end, said upper frame member having an inner end and an outer end, and a diagonal frame member extending from said upper fame member outer end to sad vertical frame member lower end, said triangular frame further including a triangular gusset fixed within said triangular frame to support said frame, and a cross-member engagement portion extending from said upper frame member outer end, said corner post brace being attached to said corner post;

a brace post brace having a triangular frame which includes a vertical frame member having an upper end and a lower end, an upper frame member extending outwardly and horizontally from said vertical frame member upper end, said upper frame member having an inner end and an outer end, and a diagonal frame member extending from said upper frame member outer end to said vertical frame member lower end, said triangular frame further including a triangular gusset fixed within said triangular frame to support said frame, and a cross-member engagement portion extending from said upper frame member outer end, said brace post brace being attached to said brace post;

an elongated cross-member, said cross-member extending between said corner post and said brace post such that said cross-member engages said cross-member engagement portion of said corner post brace and said cross-member engagement portion of said brace post brace so that said posts are braced against each other when a force is applied to one or both of said posts; and wherein at least one of said vertical frame members is rectangular having therethrough at least one mounting hole for fixing one of said braces to one of said posts with a fastening device.

3. A fence post bracing system comprising:

a corner post having a vertical axis;

a brace post having a vertical axis and spaced apart from and substantially parallel to said corner post;

a corner post brace having a triangular frame which includes a vertical frame member having an upper end and a lower end, an upper frame member extending outwardly and horizontally from said vertical frame member upper end, said upper frame member having an inner end and an outer end, and a diagonal frame member extending from said upper frame member outer end to said vertical frame member lower end, said triangular frame further including a triangular gusset fixed within said triangular frame to support said frame, and a cross-member engagement portion extending from said upper frame member outer end, said corner post brace being attached to said corner post;

a brace post brace having a triangular frame which includes a vertical frame member having an upper end and a lower end, an upper frame member extending outwardly and horizontally from said vertical frame member upper end, said upper frame member having an inner end and an outer end, and a diagonal frame member extending from said upper frame member outer end to said vertical frame member lower end, said triangular frame further including a triangular gusset fixed within said triangular frame to support said frame, and a cross-member engagement portion extending from said upper frame member outer end, said brace post brace being attached to said brace post;

an elongated cross-member, said cross-member extending between said corner post and said brace post such that said cross-member engages said cross-member engagement portion of said corner post brace and said cross-member engagement portion of said brace post brace so that said posts are braced against each other when a force is applied to one or both of said posts; and wherein at least one of said vertical frame members is flat and at least one of said vertical fame member ends includes therethrough at least two mounting holes for fixing at least one of said braces to one of said posts with a fastening device.

4. A fence post bracing system according to claim 3, wherein said fastening device includes a U-bolt.

5. A fence post bracing system comprising:

a corner post having a vertical axis;

a brace post having a vertical axis and spaced apart from and substantially parallel to said corner post;

a corner post brace having a triangular frame which includes a vertical frame member having an upper end and a lower end, an upper frame member extending outwardly and horizontally from said vertical frame member upper end, said upper frame member having an inner end and an outer end, and a diagonal frame member extending from said upper frame member outer end to said vertical frame member lower end, said triangular frame further including a triangular gusset fixed within said triangular frame to support said frame, and a cross-member engagement portion extending from said upper frame member outer end, said corner post brace being attached to said corner post;

a brace post brace having a triangular frame which includes a vertical frame member having an upper end and a lower end, an upper frame member extending outwardly and horizontally from said vertical frame member upper end, said upper frame member having an inner end and an outer end, and a diagonal frame member extending from said upper frame member outer end to sad vertical frame member lower end, said triangular frame further including a triangular gusset fixed within said triangular frame to support said frame, and a cross-member engagement portion extending from said upper frame member outer end, said brace post brace being attached to said brace post;

an elongated cross-member, said cross-member extending between said corner post and said brace post such that said cross-member engages said cross-member engagement portion of said corner post brace and said cross-member engagement portion of said brace post brace so that said posts are braced against each other when a force is applied to one or both of said posts; and wherein one end of said vertical frame member of one of said corner post brace and said brace post brace includes at least one mounting hole for fixing said brace to the associated post with a fastening device and, wherein the opposite end of said vertical frame member of the other post brace includes at least one mounting hole for fixing said brace to the associated post with a fastening device.

6. A fence post bracing system according to claim 5, wherein said corner post brace vertical frame member lower end includes the associated at least one mounting hole and, wherein said brace post brace vertical fame member upper end includes the associated at least one mounting hole.

7. A fence post bracing system comprising:

a corner post;

a brace post spaced apart from and substantially parallel to said corner post;

a corner post brace including:

a triangular frame, said triangular frame including a vertical frame member, said vertical frame member including an upper end and a lower end, said triangular frame also including an upper frame member extending outwardly and substantially horizontally from said vertical frame member upper end, said upper frame member having an inner end and an outer end, and said triangular frame also including a diagonal frame member extending from said upper frame member outer end to said vertical frame member lower end, a triangular gusset plate, said gusset plate fixed within said triangular frame and extending between said vertical frame member, upper frame member, and diagonal frame member thereby supporting said brace and, at least one fastening device adapted to attach said corner post brace to said corner post;

a brace post brace including:

a triangular frame, said triangular frame including a vertical frame member, said vertical frame member including an upper end and a lower end, said triangular frame including an upper frame member extending outwardly and substantially horizontally from said vertical frame member upper end, said upper frame member having an inner end and an outer end, and said triangular frame also including a diagonal fame member extending from said upper frame member outer end to said vertical frame member lower end, a triangular gusset plate, said gusset plate fixed within said triangular frame and extending between said vertical Fame member, upper frame member, and diagonal frame member thereby supporting said brace and, at least one fastening device adapted to attach said brace post brace to said brace post;

an elongated cross-member, said cross-member having a corner end and a brace end and extending between said corner post and said brace post, said corner end and said brace end respectively engage said corner post brace and said brace post brace hereby bracing said corner post against said brace post when a force is applied to one or both of said posts; and wherein said corner post brace includes a brace extension extending from said upper frame member and, wherein said brace post brace includes a brace extension extending from said upper frame member, whereby said corner post brace extension is insertable into said corner end of said cross-member and said brace post extension is insertable into said brace end of said cross-member.

8. A fence post bracing system comprising:

a corner post;

a brace post spaced apart from and substantially parallel to said corner post;

a corner post brace including:
- a triangular frame fixable to said corner post, said triangular frame including a vertical frame member having an upper end and a lower end wherein at least one of said ends includes therethrough at least one mounting hole for fixing said brace to said corner post with a fastening device, an upper frame member having an inner end and an outer end and extending outwardly and substantially horizontally from said vertical frame member upper end, a diagonal frame member extending from said upper frame member outer end to said vertical frame member lower end, and an engagement portion extending outwardly and substantially horizontally from said outer end of said upper frame member;

a brace post brace including:
- a triangular frame fixable to said brace post, said triangular frame including a vertical frame member having an upper end and a lower end wherein at least one of said ends includes therethrough at least one mounting hole for fixing said brace to said brace post with a fastening device, an upper frame member having an inner end and an outer end and extending outwardly and substantially horizontally from said vertical frame member upper end, a diagonal frame member extending from said upper frame member outer end to said vertical frame member lower end, and an engagement portion extending outwardly and substantially horizontally from said outer end of said upper frame member; and an elongated cross-member, said cross-member having a corner post end and a brace post end and extending between said corner post and said brace post, said corner post end and said brace post end respectively engage said engagement portion of said corner post brace and said engagement portion of said brace post brace thereby bracing said corner post against said brace post when a force is applied to one or both of said posts.

9. A fence post bracing system according to claim 8, wherein each vertical frame member of said corner post brace and said brace post brace is rectangular.

10. A fence post bracing system according to claim 8, wherein each vertical frame member of said corner post brace and said brace post brace is cylindrical and includes therethrough a bore for respectively receiving said corner post and said brace post.

11. A fence post bracing system according to claim 8, wherein at least one of said ends of each vertical frame member of said corner post brace and said brace post brace includes therethrough at least two mounting holes for fixing the associated brace to the respective corner post and brace post, and wherein each fastening device of said corner post brace and said brace post brace includes a U-bolt.

12. A fence post bracing system according to claim 8, wherein each triangular frame of said corner post brace and said brace post brace includes a triangular gusset fixed within said triangular frame and extending between said vertical frame member, said upper frame member and said diagonal frame member, thereby providing further support to the associated brace.

13. A fence post bracing system according to claim 8, wherein one end of said vertical frame member of one of said corner post brace and said brace post brace includes at least one mounting hole for fixing said brace to the associated post with a fastening device and, wherein the opposite end of said vertical frame member of the other post brace includes at least one mounting hole for fixing said brace to the associated post with a fastening device.

* * * * *